March 18, 1941.   C. H. KLEIN   2,235,685
METAL CABLE HANGER
Filed April 6, 1940   2 Sheets-Sheet 1
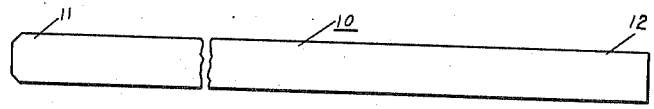
Fig. 1
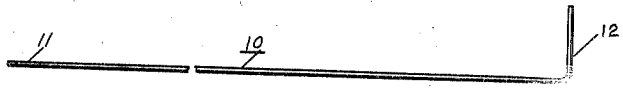
Fig. 2
Fig. 3
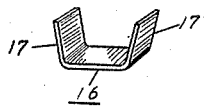
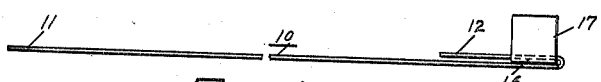
Fig. 4
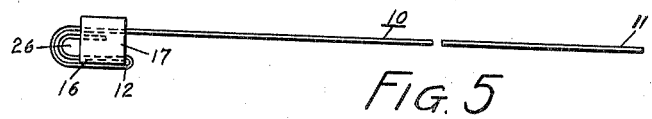
Fig. 5
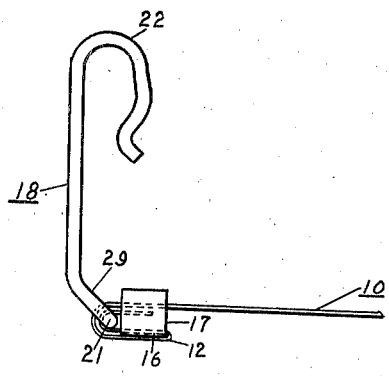
Fig. 6
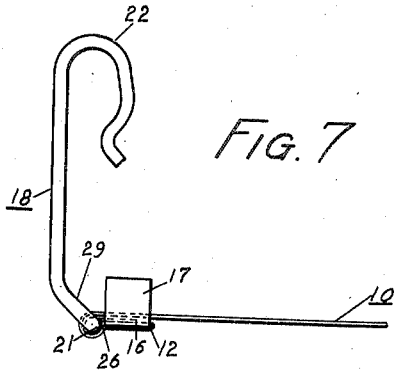
Fig. 7
INVENTOR.
Charles H. Klein
BY Hoodling and Krost
ATTORNEY.

March 18, 1941.          C. H. KLEIN          2,235,685
METAL CABLE HANGER
Filed April 6, 1940          2 Sheets-Sheet 2

INVENTOR.
Charles H. Klein
BY
ATTORNEY.

Patented Mar. 18, 1941

2,235,685

UNITED STATES PATENT OFFICE 2,235,685

METAL CABLE HANGER

Charles H. Klein, Cleveland, Ohio, assignor to The National Telephone Supply Company Application April 6, 1940, Serial No. 328,334

5 Claims. (Cl. 248—61)

My invention relates to an improvement in cable hangers adapted to support a heavy lead cable at relatively closely spaced intervals from a messenger strand, the messenger strand being supported at relatively widely spaced intervals.

In the past, the most widely used method of supporting the cable from a messenger strand was by means of cable rings. The cable rings are substantially U-shaped supports which hang at spaced intervals from the messenger strand which, in turn, is fastened to the poles. A lead covered telephone cable is then drawn through the rings and the job is complete. When subject to vibration from wind or other causes, the one or two rings nearest the pole sometimes cut into the lead sheath. This action is known in the field as "ring cutting" and when it occurs it is a serious condition. To reduce this cutting saddles are placed in the pole position rings between the cable and the ring. The saddles increase the bearing area between the cable and the ring and thereby reduce the ring cutting. Other methods are to remove the pole position rings and substitute zinc cable-clips or marline cable hangers. The oldest method of supporting the cable is the marline hanger which comprises a hook to go over the messenger strand and a marline or rope which ties around the cable and onto the hook. This method of suspending the cable does not cut the cable but the marline readily deteriorates and replacement costs are high. The zinc cable-clip reduces replacement due to deterioration but introduces a new difficulty. Vibration of the cable with respect to the messenger strand causes the zinc strap to crystallize and break. The crystallization is due to slight but constant bending action as the cable vibrates, commonly called fatigue.

My invention may be utilized to replace the rings near the pole to obviate ring cutting, or in the event it becomes desirable, my invention may be used to provide all of the support between the poles.

An object of my invention is to provide a device for suspending a cable from a messenger strand which is not subject to failure due to weathering and fatigue conditions and which is quickly and economically installed and which, after installation, requires little or no service.

Another object of my invention is to provide a metal cable hanger for swingably suspending a cable from a messenger strand thereby reducing fatigue failures and to so construct the hanger that it can be easily installed.

A further object of my invention is to provide a cable hanger with a long metal strap adapted to wrap several times around the cable to be supported and to provide a foldable clasp device for fastening the last reach of the metal strap.

Still another object of my invention is to provide a hanger which can be quickly and economically installed and which has a long life thereby reducing replacement costs.

Other objects and a fuller understanding of my invention may be had by referring to the following description and claims, taken in conjunction with the accompanying drawings, in which:

Figure 1 is a plan view of the metal strap used in my device.

Figure 2 is a side elevation of the metal strap with one end portion bent up.

Figure 3 is an isometric view of the clasp member used in my device.

Figure 4 is a side elevation of the metal strap with the clasp member shown in Figure 3 in place and the turned up end portion of the strap bent back upon the clasp.

Figure 5 is a view similar to Figure 4 after the metal strap has been bent back upon itself a second time to provide a loop.

Figure 6 is a side elevation showing a supporting member positioned in the loop.

Figure 7 is a view similar to Figure 6 after the metal strap has been bent about the supporting member and represents the finished device as manufactured.

Figure 8:
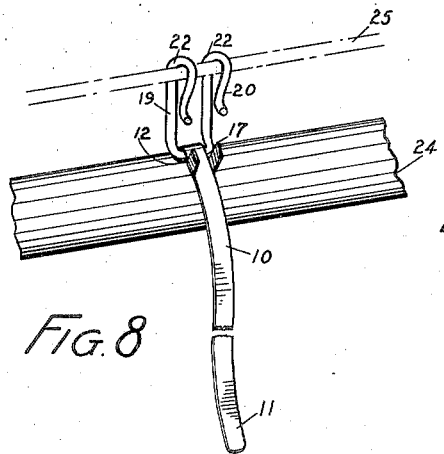
Figure 8 is a view showing my device suspended from a messenger strand and positioned to be wrapped about a cable.
Figure 9:
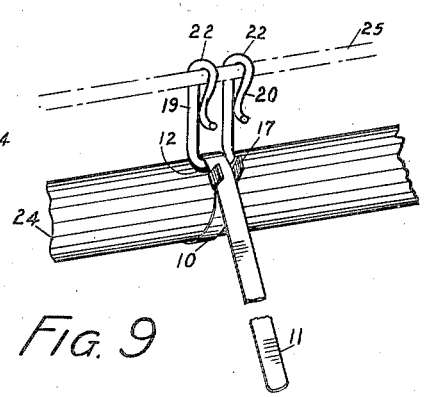
Figure 9 shows my device wrapped about the cable.

With reference to the drawings my invention comprises a relatively thin metal strap, so as to be pliable and bendable and is indicated generally by the reference character 10. The strap 10 has a first end portion 11 and a second end portion 12. A relatively stiff clasp member shown in detail in Figure 3 and indicated generally by the reference character 16, is adapted to be positioned on the strap 10 and held therein by the second end portion 12 being folded back upon itself to clamp the clasp member 16. Foldable end portions 17 are provided on the clasp member 16 and cooperate to hold the member in place on the strap 10.

A supporting member 18 is provided to engage the messenger strand 25 and support the cable 24. The supporting member 18 comprises two spaced wire portions 19 and 20 each with a hook portion 22 adapted to hook over the messenger strand, and a horizontal bar portion 21 integral with the two spaced wires 19 and 20. The horizontal bar portion 21 is adapted to be engaged by the second end portion 12 of the strap member 10, thereby anchoring the end 12 of the strap 10.

The manner of attaching the end portion 12 of the strap member 10 to the horizontal portion 18 establishes a hinge action between the supporting member 18 and the strap 10. A loop 26 is formed by doubling the end portion 12 of the strap 10 back upon itself as is shown in Figure 5. This is the second time the end 12 has been doubled back upon itself and consequently provides a double thickness of metal about the horizontal bar portion 21 as may be clearly seen in Figures 6 and 7. The hinge action between the strap 10 and the horizontal bar portion 21 prevents a swinging action of the cable with respect to the messenger strand from bending the metal strap 10 and consequently prevents fatigue failure.

Figure 10:
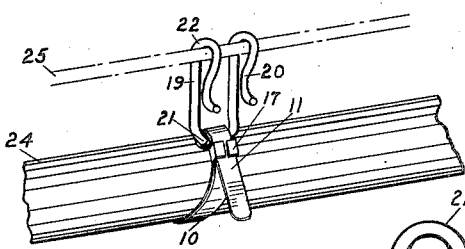
Figure 10 is a view similar to Figure 9 but showing the clasp member bent into place.
Figure 11:
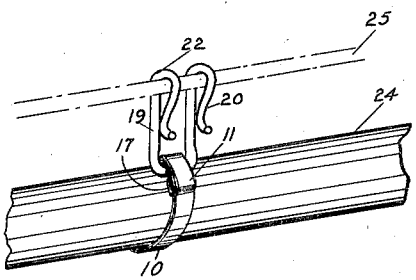
Figure 11 is a view similar to Figure 10 but showing one end of the metal strap bent back over the clasp member.
Figure 12:
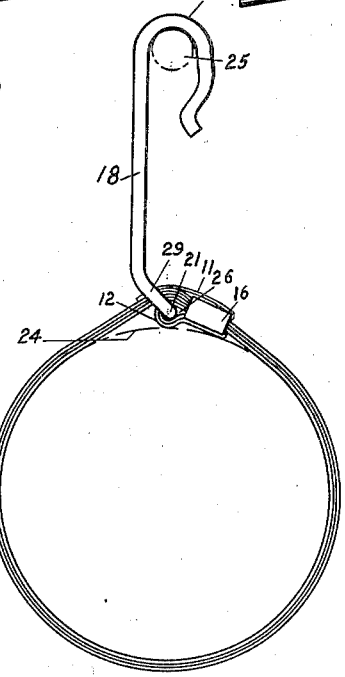
Figure 12 is a side view of my invention as it appears wrapped around a cable, as diagrammatically shown by the dash-dot-line.

To suspend a cable 24 from a messenger strand 25 the hooked portion 22 of the two spaced wires 19 and 20 are hung on the messenger strand 25 with the strap portion 10 hanging downwardly across the cable 24. Figure 8 illustrates the starting position. The strap 10 is then wound about the cable 24 as many times as its length will permit. During the winding operation the foldable portions 17 of the clasp member 16 are positioned outwardly to permit the successive reaches of the strap 10 to be drawn between the foldable portions 17. By so positioning the foldable portions 17 each reach or pass of the strap 10 about the cable 24 can be pulled and maintained tight by the linesman. Any link or bar which permanently extends across the strap 10 greatly hampers the linesman and renders it difficult for him to pass the strap 10 under the bar or link without loosening the previous reach. After the strap 10 has been wound about the cable 24 as many times as its length will permit the foldable portions 17 of the clasp 16 are folded over and snugly engage the top surface of the strap as may be seen in Figure 10, regardless of the number of reaches wrapped about the cable which may vary from one wrap to any desired number. The folded portions 17 may be bent downwardly by one's thumbs after which they may be lightly tapped with a tool to assure that they are snugly folded down against the strap 10. After positioning the foldable portions of the clasp 16 the free end portion 11 of the strap 10 is folded back upon itself as shown in Figures 11 and 12. As another alternative, the free end portion 11 of the strap 10 may be folded back upon the foldable portions 17 of the clasp 16 before they are tapped with a tool, so that the entire arrangement may be tapped down with a tool in one operation. The foldable portions 17 constitute a bar about which the free end 11 may be folded and when the end 11 is tapped slightly with a tool such as a pair of pliers along the line of the fold it will prevent the strap 10 from slipping and loosening up. As shown in Figure 12, the cable is tightly wrapped by the strap and prevents any turning of the cable within the strap. In the event a turning or rolling action of the cable tends to take place, the turning movement occurs about the hinge 26. Longitudinal movement of the cable causes the support 22 to slide along the messenger or support strand instead of the longitudinal movement occurring between the cable and the strap.

By using foldable tabs 17 which are bent away from the strap 10 my device may be more tightly applied to a cable than a device which has a link or fixed clasp bar extending from one side of the strap to the other and under which the strap would have to be passed on each reach of the strap.

The clasp member 16 and the horizontal bar portion 21 are positioned close together in order for the clasp member to engage several thicknesses of the metal strap and form the loop 26 in which the horizontal bar 21 is hinged. By positioning the clasp member 16 and the horizontal bar portion 21 close together and by passing portions of the end 12 of the strap 10 through the clasp 16, the clasp holds the loop 26 in its proper shape. That is, if the clasp 16 did not aid in holding the loop 26 a heavy pull between the cable 24 and the messenger strand might deform the loop 26 enough to cramp the bar 21 and cause a swaying of the cable to bend the strap 10. A single clasp means thereby becomes a means for holding the anchored end 12 of the strap 10 as well as a means for clamping the free end 11 of the strap. To prevent the lower ends of the left and right spaced wires 19 and 20 from bumping into and rubbing the clasp member 16 as the cable 24 swings back and forth with respect to the messenger strand 25 I provide an off-set portion 29 in the supporting member 18. The off-set portion provides a swinging clearance between the supporting member 18 and the foldable portions 17 of the clasp and allows the cable 24 to swing through a large arc without bumping or interfering with the clasp member. By providing the wide swinging clearance between the off-set portion of the supporting member 18 and the clasp member 16 it is possible to make the horizontal bar 21 shorter than it would be if the clearance were not provided. In the absence of the off-set portion the horizontal bar 21 would be required to extend laterally beyond the clasp member 16 in order that the spaced wires 19 and 20 will not rub against the clasp 16. By providing an off-set portion 29 and a swingable clearance I can shorten the horizontal bar portion 21 and still prevent the wires 19 and 20 from interfering with the clasp 16. The shortened horizontal bar portion is advantageous as a pull on the bar will not cause it to bend and sag as much as it would if it were longer.

A further advantage of the off-set horizontal bar portion 21 lies in the positioning of the cable 24 with respect to the messenger strand 25. By making the amount of the off-set substantially equal to the radius of the curvature of the hook portion 22, the cable 24 will hang substantially directly beneath the messenger strand 25. This is clearly shown in Figure 12. Such positioning of the cable with respect to the messenger strand reduces the strain in the device to a minimum.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim as my invention:

1. A supporting hanger comprising a hook-member having an offset bar, a strap member having two ends, the first end of which is adapted to encircle the said offset bar and the remainder of which is adapted to encircle a cable to be supported, and fastening means connected to the first end of the strap and adapted to fold over the second end of the said strap after the said strap has encircled the cable to be supported thereby clamping the first end of the said strap around said offset bar and to the said second end of the said strap.

2. A hanger comprising a pair of hook-members having a transverse bar therebetween, a strap member having two end portions and a central portion, the first end portion of said strap being wrapped around said transverse bar and the central portion of said strap encircling a cable to be supported, and fastening means attached to the first end portion of the said strap and adapted to be folded about the central portion to engage the said second end portion of said strap member to clamp the strap member about the said cable and connecting said first end of the said strap member to the transverse bar.

3. A hanger for supporting a cable from a supporting element comprising a member adapted to engage the supporting element and having a bar portion, a strap member having two end portions and adapted to encircle the cable to be supported, one end of said strap member being connected to said bar portion to establish a hinge, and fastening means connected to said hinge end of said strap and adapted to fold over said strap after the said strap has been wrapped about said cable, and the other end of said strap member being adapted to fold over the said fastening means to prevent the said strap member from slipping.

4. A hanger for supporting a cable from a messenger strand comprising two supporting hooks and a lateral bar portion, a strap attached at one end to said bar portion and adapted to be wrapped several times about the said cable to be supported, and fastening means attached to the said strap near said bar portion, said fastening means extending away from said strap whereby said strap may be wrapped several times about said cable without interference from said fastening means and said fastening means being adapted to fold over the several reaches of the strap to fasten the said strap and establish a bar about which the said strap can be folded back upon itself to prevent slippage.

5. A hanger for supporting a cable from a messenger strand comprising a strap having two end portions, a fastening member having two foldable means, one of said end portions of said strap being doubled back upon itself about said fastening member to attach said fastening member to said strap, a supporting member adapted to engage the said messenger strand and having a horizontal bar portion, said double-back end portion of said strap being re-doubled about said horizontal bar portion to establish a swingable joint hinged in a double thickness of strap material, said strap being adapted to wrap several times around the said cable to be supported and each reach of the strap being positionable between the said two foldable means of the said fastening member, and said foldable means of the fastening member adapted to fold over and closely engage the last reach of the said strap and establish a bar about which the other end portion of the said strap can be folded back upon itself to prevent the said strap from slipping.

CHARLES H. KLEIN.